C. H. McCormick
Mower.

No 637 Reissued Dec 21. 1858

UNITED STATES PATENT OFFICE.

C. H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858.

*To all whom it may concern:*

Be it known that I, CYRUS H. McCORMICK, of Chicago, in the State of Illinois, have invented new and useful Improvements in the Reaping-Machine formerly patented by me; and I do hereby declare that the following is a full, clear, and exact description thereof, reference being had to the accompanying drawings, making part of this specification, in which—

Figure 2:
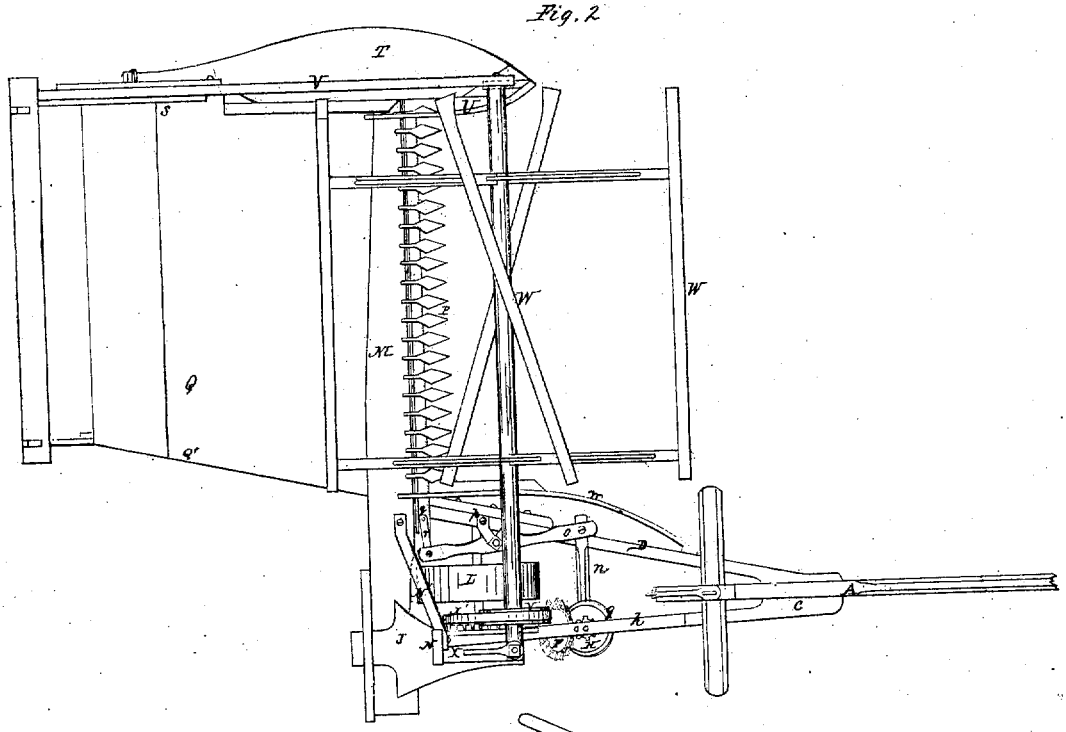
Figure 3:
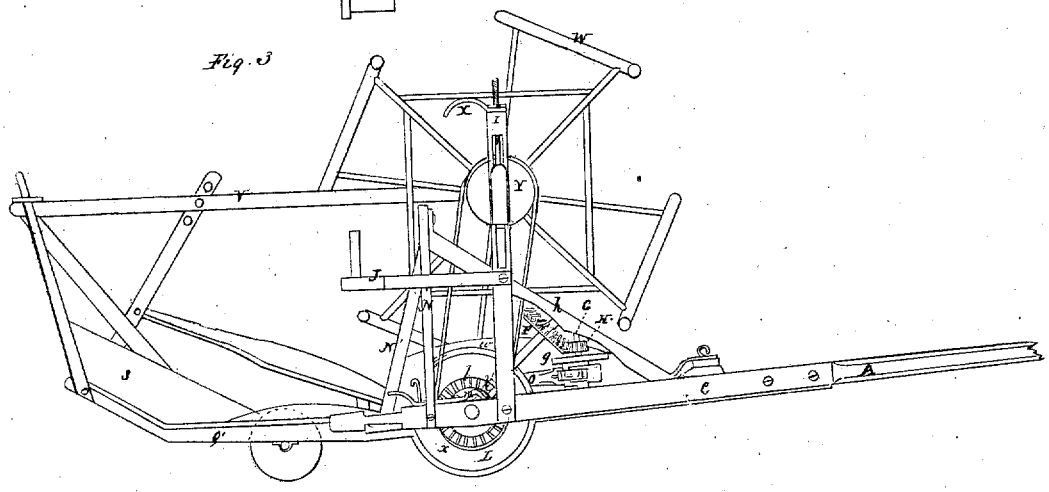
Figure 1:
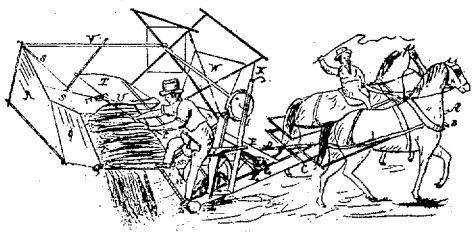

Figure 1 is a perspective view; Fig. 2, a plan, and Fig. 3 a side elevation.

The same letters indicate like parts in all the figures.

The reaping-machines heretofore made may be divided into two classes, the first class having a seat for a raker to sit on, located over the driving-wheel, where, with a hand-rake having a head equal in length to the width of the swath cut, he performs the double office of gathering the grain to the cutting apparatus and on the platform, and then of discharging it from the platform on the ground behind the machine. This was defective, for the reason that the labor to the operator was very great, as he had to reach over to enter the head of the rake in the uncut grain, to gather it to the cutting apparatus, and then to push it off at the back of the machine, but principally because the grain was discharged behind in the wake of the machine, rendering it necessary to gather and remove the grain before the return of the machine to prevent it from being trodden down by the horses. The defects of the first class were remedied by the second class, in which a reel was employed to gather the grain to the cutting apparatus and deposit it on a platform, from which it was raked off by an attendant, who deposited the grain on the ground by the side of the machine, where it could lay as long as desired, the whole width of the swath being left unencumbered for the passage of the horses on the return of the machine to cut another swath; but this latter class was still defective, for the reason that the reel, which performs in part the office of the raker in the other class, and in the performance of which office necessarily occupies the place which the raker occupied, left no practically available place on the machine for him, so that it became necessary for the raker to walk on the ground by the side of the machine to perform the remaining duty of raking off the grain from the platform, which was attended with much labor and inconvenience—labor, because he must walk to keep up with the machine while he is operating the rake with his arms, and inconvenience, because, to enable him to get hold of the grain on the platform as the reel is revolving, he must stand in the very place where the grain should be deposited to be properly laid. It may be here stated, however, that as respects the difficulty of obtaining a place on the machine for the raker to take the grain from the reel another class than the one just referred to of machines with reels has to some extent been experimented with and worked to which this difficulty would not apply—that is, such machines as have been propelled by horses attached to the rear of the machine, the principal frame-work of which was placed in advance of the horses and between them and the reel, and supported by two wheels, one on each side of the frame, thus admitting of placing a man on the frame-work in the rear of the reel. This class of reel-machines therefore I will here designate as "propellers," to distinguish it from the class of reel-machines described immediately preceding it, which I will also designate as "side-draft" reel-machines; and in order to be more definitely and distinctly understood as to what I denominate the "side-draft" reel-machine, it is proper to state, further, that it is the machine referred to as heretofore made by me, or others substantially similar thereto, which has one main driving-wheel upon the right-hand or gear side of the machine, which sustains the larger portion of the weight of the machine, and by its adhesion to the ground communicates action to the machinery, and which is placed outside of the grain to be cut or of the reel and cutting part of the machine and in the rear of the horse or horses by which it is drawn, the opposite side of which machine is sustained by a small running wheel placed under the left or grain side of the platform of the machine, which has its place of discharge for the grain on the right or driving-wheel side, near the edge of the swatch-cut, and sufficiently far from the standing grain for the cut grain to be out of the return-track of the horses, the machine being thus sustained upon the two wheels just described, in connection with the preponderating weight upon the horses in front, to give steadiness to the action of the machine. It may be remarked, further, that sundry efforts have hithereto been made to introduce upon this side-draft machine a stand or support to enable the attendant or raker to discharge the grain from the machine out of the return-track of the horses, but which have been defective. In some cases it was attempted by introducing a double platform, by which I mean a platform extending over the width of the swath and also behind the driving-wheel and frame-work of the machine. These experiments were made in connection with apparatus designed to assist the raker by bringing the grain over the first platform, or that part immediately behind the cutting apparatus of the machine, to the part behind the wheel, on which part the operator was placed. Another experiment was also made to introduce a separate and independent carriage from the machine, which was designed to carry the attendant, and which moved and operated independently of the machine upon two small wheels, in consequence of which separate action and movement it was liable to be jostled in running over the uneven ground, which interfered with the removal of the grain from the platform and with its delivery onto the ground. It becomes necessary to provide a stand or support on this side-draft reel-machine to carry the attendant or raker in a suitable position to enable him, properly secured or supported, to get at the grain behind the reel as it is delivered by the reel onto the platform and remove it therefrom onto the ground in a position out of the return-track of the horses and machine.

These machines were defective in the following particulars: The driving-wheel was placed forward of the mechanism which operates the vibrating sickle, and so far forward as to leave too much of the weight of the machine back of the driving-wheel for the proper application of a raker's stand with the raker thereon, and therefore tending to strain the horses, as well as the frame of the machine; and the gearing which communicates motion to the crank was placed back of the driving-wheel, which was therefore subject to be clogged by sand, dirt, straw, &c. These defects, which have so much retarded the introduction into practical and general use of reaping-machines, I have remedied by my improvements, which consist in placing the driving-wheel farther back than heretofore, and sufficiently far back to balance the rear part of the frame and platform of the machine with the rake thereon, in connection with the raker's stand or support, which I place or secure behind the axis of the reel and upon the short or single platform herein described; and, also, in constructing and combining with the reel, which deposits the grain onto the platform, a stand or support for the raker to stand in fixed to the frame or platform and moving in uniformity with the platform, and to give due support to the lower part of his body that the upper part may be free to enable him to operate the rake with his arms, and sufficiently far behind the axis of the reel that he may have convenient access to the grain as the reel throws it down on the platform, and rake it off quickly with a free and natural sweep of his arms, and deposit and lay it properly on the ground by the side of the machine out of the return-track of the horses in suitable quantities for being bound into sheaves, thus preventing the obstruction of the operation of the reel by too large an accumulation of the cut grain on the platform, the effect of which obstruction would be to press down and pass over the grain in front of the machine instead of gathering and cutting it by its regular action; and, also, in constructing the stand or support for the raker in such a manner, hereinafter described, that he is supported in an upright position, with the lower part of his body braced both laterally and forward, while the upper part of his body is left free to remove the grain without excessive strain or labor.

In the accompanying drawings, M represents a flat beam, (called the "finger-piece,") forming the front part of the platform, to a part of the forward edge of which are secured the fingers P, such as are used in the machine heretofore patented by me, and under these fingers is arranged the vibrating sickle, which receives its vibrating motion in manner to be hereinafter described. The finger-piece is firmly attached at one end to the oblique hounds C and D, which run toward each other and are bolted to the tongue A, the forward end of which passes through the breast-piece.

The team is harnessed to the tongue, hounds, and breast-piece in the usual or any desired manner. The axle of the driving-wheel L has its bearings in the two hounds so near the back end thereof as just to leave room for the wheel to run clear of the finger-piece, and to the outer end of the axle of the driving-wheel is attached a beveled master cog-wheel, *l*, which communicates motion to a bevel-pinion, *l'*, on the lower end of an inclined arbor, to the upper end of which there is another beveled wheel, F, which communicates motion to the drive-pinion H on a vertical crank-arbor, G, that has a fly-wheel, *g*, on it between the crank and pinion. The crank-arbor has its bearings on the outside hound and the oblique brace *h*, and the inclined arbor has its upper bearing in the oblique brace and its lower end in a shifting-lever, *m*, by means of which the pinion *l'* can be thrown in and out of gear with the master bevel-wheel *l* when it is desired to reap or move the machine without reaping. A connecting-rod, *n*, from the crank extends horizontally to the forward end of the lever *o*, which turns on a fulcrum-pin, *p*, attached to the inside hound, and thence runs back to form a connection with the end of the sickle *q* by means of a short connecting-rod, *r*. By this arrangement of parts the gearing is placed forward of the driving-wheel, and motion is communicated from thence to the sickle back of the axis of the driving-wheel by the vibrating lever, thus placing the driving and supporting wheel back of the gearing, and far enough to balance or sustain the weight of the rear part of the frame and platform and the raker thereon with a due preponderance of weight forward upon the horses, preventing the front of the machine from tilting up, and the attendant or raker is placed on a stand or seat, J, behind the axis of the reel and over one end of the finger-piece. The raker's stand is straddled by the raker, so that he can either sit on it when requiring rest or stand with his feet on the frame, and with his seat between his legs to steady him laterally when standing at work. The seat J is attached to the standard N, which rises from the outside hound, and to the oblique brace *h*, and it is braced also by the diagonal brace N′, which runs down from the post to the finger-piece M near its junction with the inside hound. On the front of the seat there is a bar or plate against which the raker can lean forward, and which will thus give him ample support when leaning forward to get at the grain without impeding the motion of his body. From this position, as represented in Fig. 1 of the drawings, the raker is sufficiently far behind the axis of the reel to get at the grain back of the reel, and is supported both laterally and forward, and by a natural sweep of his arms delivers it on the ground at right angles to the swath, as shown in the figure, out of the return-track of the horses, from a short platform, Q, or platform having its mouth of discharge, Q′, inside (next to the standing grain) of the track of the driving-wheel, which I denominate "a short platform."

To give free scope to the arms of the raker, the reel W is made shorter than usual at that end instead of overlapping or extending beyond the range of fingers; and to prevent the grain or straw from passing under the frame or into the gearing which operates the sickle there is what I denominate a "wheel-board," U—that is, a curved board the forward end of which is secured to the inside hound. The forward end is curved to force the grain in toward the reel, and then it runs back to the platform Q, parallel with the plane of motion of the end of the reel. At the other end of the finger-bar there is a separator, T, or long finger, which projects beyond the points of the fingers P, to separate the grain that is to be cut, and to the point and top of this is attached a metal guide or support, *u*, which extends back to the sickle to support the grain while being cut. The outer edge of the separator runs out in a curved line to force out the grain that is not to be cut and effect a perfect separation of it from the cut grain. At this end of the platform there is a board, S, to prevent the cut grain from dropping out on that side, and at the back there is a cloth screen to prevent its dropping out in the rear. The reel W has its bearings at the outer end, in the end of a horizontal beam, V, which is attached to the frame that supports the back screen, and further supported by braces, so as to avoid the use of a standard at that end, as heretofore; and the inner end of the reel has its bearing in a sliding box in a standard, I, attached to the outside hound and the diagonal brace *h*, the sliding box having a tapped stem running up above the standard, with a screw-nut, X, by means of which may, with convenience, be tightened the belt that runs from the driving-pulley *x* (on the axle of the driving-wheel) over the pulley Y on the axle of the reel.

What I claim as my invention, and desire to secure by Letters Patent as improvements on the reaping-machine secured to me by Letters Patent bearing date the 21st of June, 1834, and the 31st of January, 1845, is—

1. The combination of the support or stand for the raker, placed behind the axis of the reel, balanced or sustained, with the raker thereon, by the driving-wheel, with the reel and with the short platform, substantially as herein described.

2. Combining with the side-draft-reel reaping-machine, having a reel for gathering the grain to the platform, a stand or seat for the raker fixed firmly upon the platform of the machine, so as to enable the raker securely to get at the grain as deposited on the platform by the reel, and deliver and lay it properly on the ground from a single or short platform, out of the return-track of the horses, in suitable gavels for being bound into sheaves, substantially as herein described.

3. The combination of the reel for gathering the grain to the cutting apparatus and depositing it on the platform with the stand or support for the raker, constructed and arranged substantially as described, or the equivalent thereof, to enable him with ease and celerity regularly to remove the grain from the machine and lay it on the ground out of the return-track of the horses.

4. The construction of the stand or support for the raker on the frame or platform of the machine, substantially as described, so that it gives to the raker such lateral and forward support to his body when standing at work that he may have free use of his arms and the upper part of his body to remove the cut grain from the platform, while at the same time he is so held fast that he cannot be thrown upon the reel nor prevented from performing his functions by the jolting of the machine as it moves over the uneven ground.

C. H. McCORMICK.

Witnesses:
P. McKENNA,
H. T. L. WILSON.